United States Patent [19]

Dahan et al.

[11] 4,409,583
[45] Oct. 11, 1983

[54] VIDEO SYSTEM FOR ASSISTING AUTOMOBILE TRAFFIC EMPLOYING A SEGMENTED LCD DISPLAY

[76] Inventors: Pierre-Louis Dahan, 106, Bd. Pereire, Paris, France, 75017; Phac Letuan, 5, Parc de la Bievre, L'Hay-les-Roses, France, 94240

[21] Appl. No.: 265,797

[22] Filed: May 21, 1981

Related U.S. Application Data

[63] Continuation-in-part of Ser. No. 236,991, Feb. 23, 1981.

[51] Int. Cl.³ .......................... G08G 1/00; G09G 3/18
[52] U.S. Cl. ..................................... 340/22; 340/765
[58] Field of Search .......................... 340/22, 765, 752

[56] References Cited

U.S. PATENT DOCUMENTS

| | | | |
|---|---|---|---|
| 3,466,598 | 9/1969 | Cruger et al. | 340/22 |
| 3,537,096 | 10/1970 | Hatfield | 340/734 |
| 3,899,662 | 8/1975 | Kreeger et al. | 340/745 |
| 3,988,533 | 10/1976 | Mick et al. | 340/720 |
| 4,271,410 | 6/1981 | Crawford | 340/765 |
| 4,370,733 | 1/1983 | Gaudio | 340/752 |

*Primary Examiner*—Glen R. Swann, III
*Attorney, Agent, or Firm*—Kane, Dalsimer, Kane, Sullivan and Kurucz

[57] ABSTRACT

Radio system for video display of a map and symbols traced on the map: It comprises means for radio transmitting a plurality of digital messages, each including the address of a map among a plurality of maps, the definition of symbols among a plurality of symbols and the coordinates of the symbols on the map. At the receiving station, there is provided a display device having a plurality of points defined by coordinates and which can be selectively activated, a plurality of transparent views representing the maps and a selector for selecting a view of given address. The selected view is projected on to the display device. The message including a map address equal to the address of the selected view is also selected and display logic means activates the points of the display device in response to the definition and coordinates of the symbols contained in the selected message.

5 Claims, 15 Drawing Figures

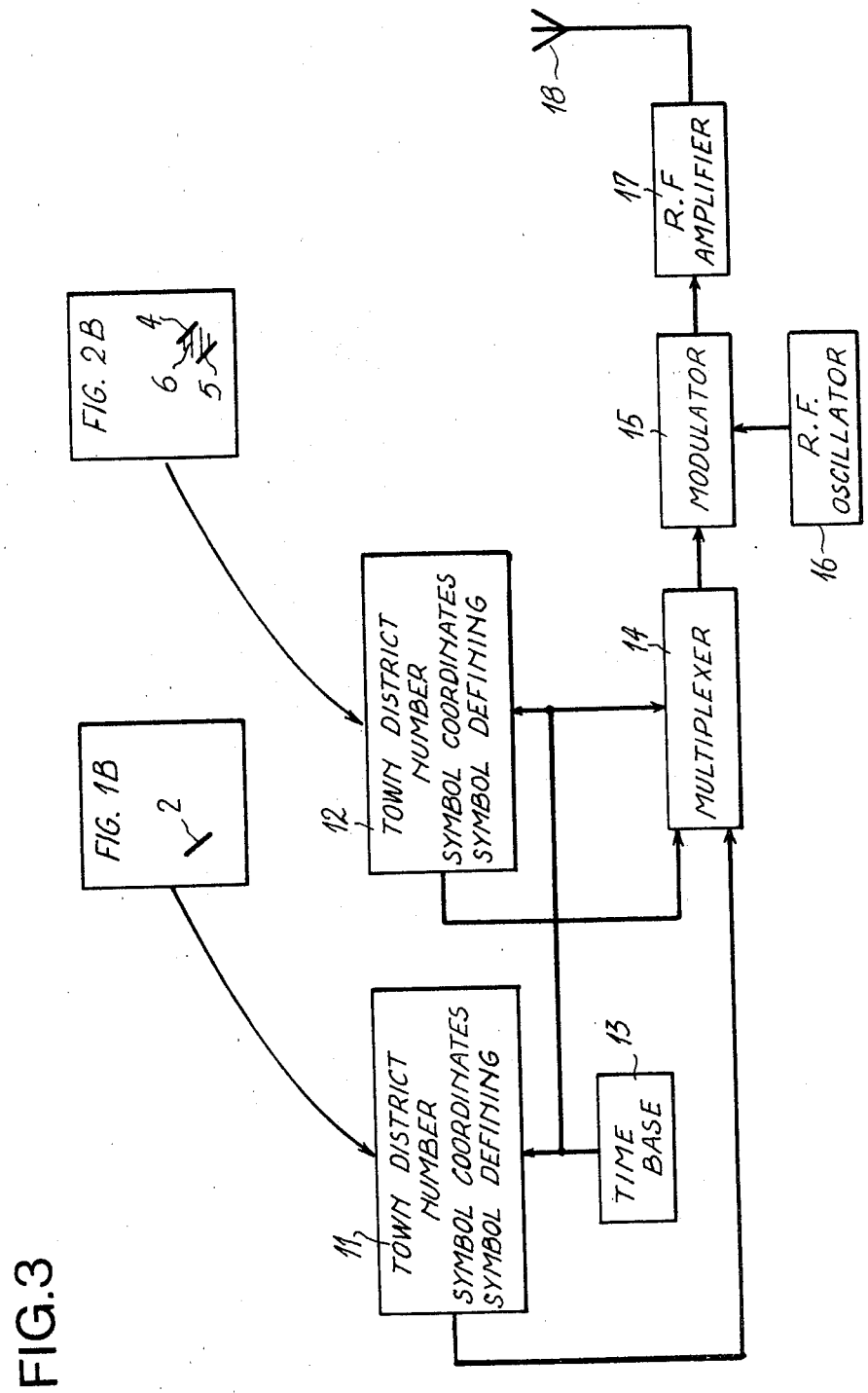

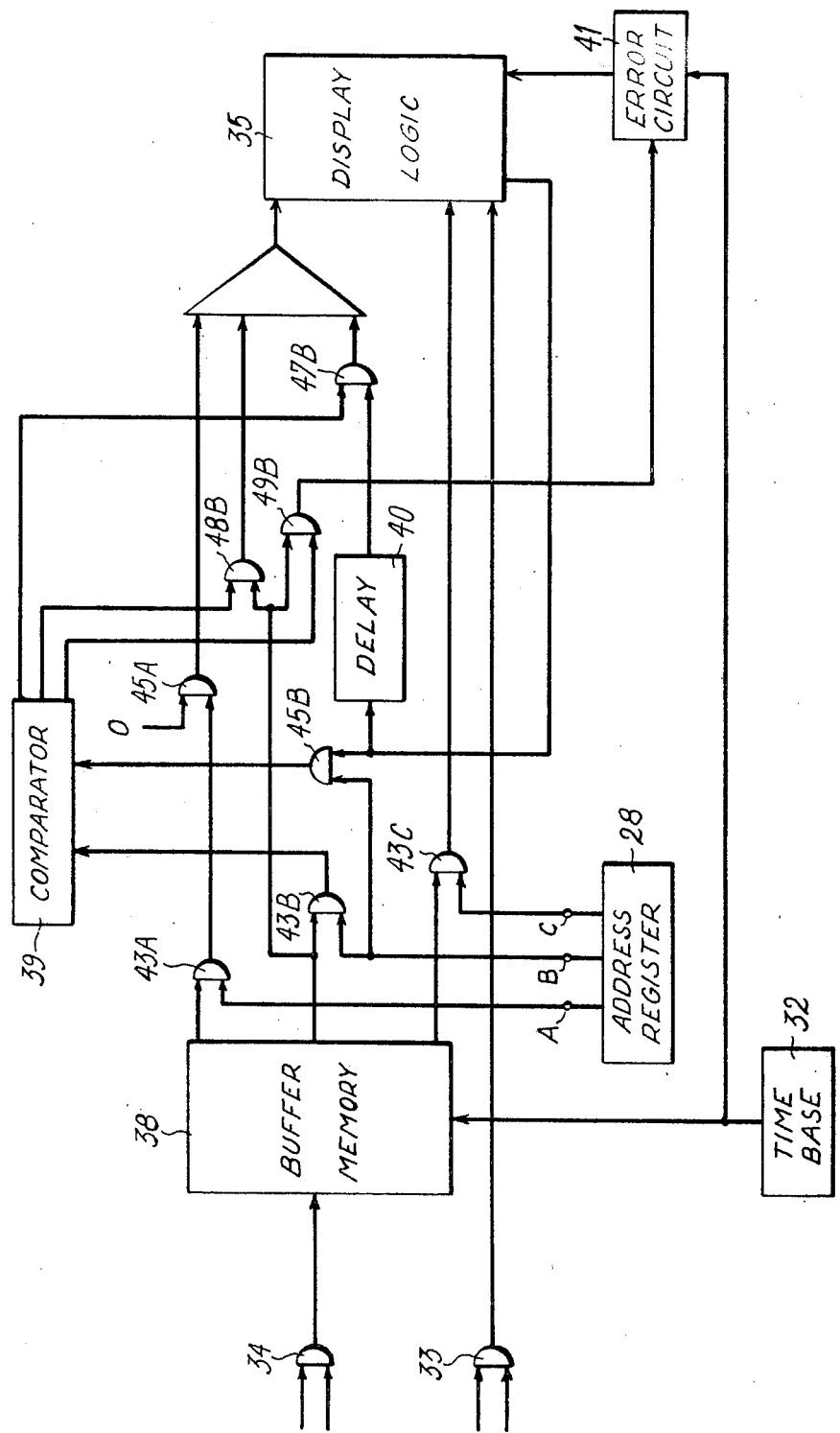

VIDEO SYSTEM FOR ASSISTING AUTOMOBILE TRAFFIC EMPLOYING A SEGMENTED LCD DISPLAY

CROSS REFERENCE TO A RELATED APPLICATION

The present application is a continuation-in-part of application Ser. No. 236,991 filed Feb. 23, 1981.

BACKGROUND OF THE INVENTION

Field of the Invention

The present invention concerns a digital video system for assisting automobile traffic wherein traffic flow and traffic build-up signals are transmitted along a radio-frequency channel by a transmitter unit to receiver units placed in motor vehicles and are displayed on screens that can be seen by the drivers.

German Pat. No. 2 115 547, filed Mar. 31, 1971, has disclosed a process for transmitting through television channels provisional graphical information traced on a permanent map or plan without transmitting the permanent map or plan itself. Two identical maps or plans are located at the originating and terminating stations of the television channel and the map or plan at the originating station is coveed with a polarizer parallel sided shet. The provisional information is traced on this sheet and a transmit camera, the objection of which is covered by a polarizer member whose polarization direction is perpendicular to the polarization direction of the polarizer sheet scans the map or plan together with the provisional information traced thereon. Only the provisional information is transmitted and at the terminating station it is combined with the permanent information locally provided by a receive camera scanning the map or plan at the terminating station.

This prior art process presents several drawbacks when used for providing traffic information to car drivers. First, transmission is achieved through television channels which necessitates the use of ultra high frequency carriers and the use of cameras, impractical in ordinary cars. Secondly, the traffic state announcements are made irregularly only when the traffic undergoes at least one substantial change. Thus, the traffic information state at any instant comprises a part changed and a part unchanged from the preceding announcement. The prior art does not provide any means for distinguishing these two parts of the traffic information and for synthetizing the same.

SUMMARY OF THE INVENTION

In the invention, a transmit unit transmits messages in sequence concerning only traffic flow and build-up indications to the exclusion of plans or maps of the zones to which the indications refer. These plans or maps are held by the car driver in the form of transparencies or a film cassette and are selectively set by him in the receive unit. The display device is a large area liquid crystal display of transflective viewing mode. A transparent display screen is provided close to the liquid crystal display and the selected transparency or the film image is projected on this screen. The viewer sees the symbols on the liquid crystal display and the map on the display screen superimposed on each other.

It thus results that the complete map or plan of traffic flow and build-up in a sector comprises a map or plan background memorized locally and displayed as an image fixed part and a traffic flow and build-up indication superimposed on the screen on this map or plan background which constitutes a variable part of the image. The variable image is devired from a message transmitted by the transmitter unit and containing only variable information to the exclusion of any basic fixed information.

The message therefore only calls for a small pass band and the transmission is made at a relatively low carrier frequency of the same magnitude as those used for communications between fixed and moving units and not at a UHF carrier frequency aproaching those used in television networks.

To summarize then, the image displayed on the receiver unit display screen results from adding a fixed image formed locally using data memorized in the receiver unit and a variable image received from the transmitter.

The receiver unit chooses the proper message amongst those transmitted through time division multiplexing by the transmitter unit which has a predetermined address. This message is decoded into symbols and symbol coordinates which are stored in a variable image memory.

BRIEF DESCRIPTION OF THE DRAWINGS

The invention will now be described in detail with reference to the drawings appended hereto wherein:

FIG. 3 represents, in block-diagram form, the transmitter unit used in the transmission system for assisting the motor vehicle traffic flow;

FIG. 6 represents, in block-diagram form, a modification of the receiver unit in FIG. 4;

DETAILED DESCRIPTION OF THE PREFERRED EMBODIMENT

Figure 1A:
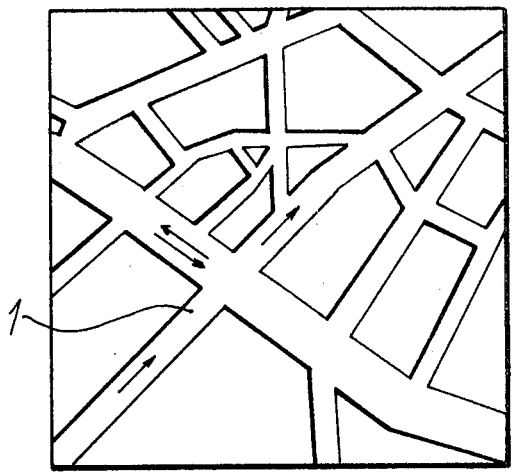
FIGS. 1A, 1B and 1C represent a fixed image, a variable image and a composite image respectively, where the latter image corresponds to a first case of traffic build-up.
Figure 1B:
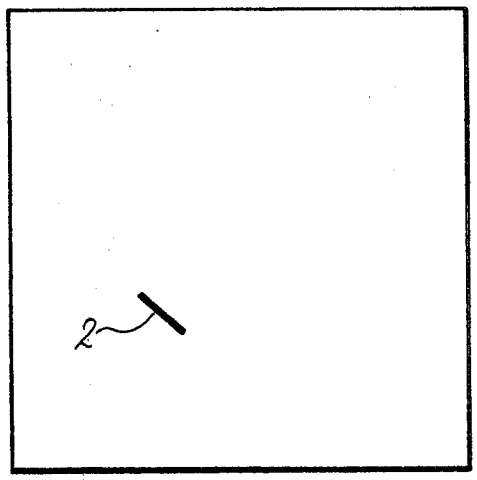
Figure 1C:
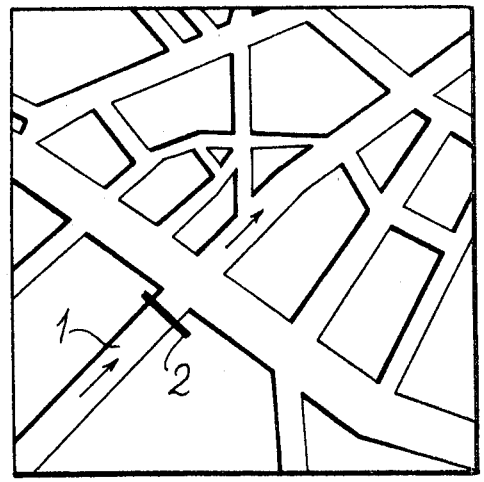
Figure 2A:
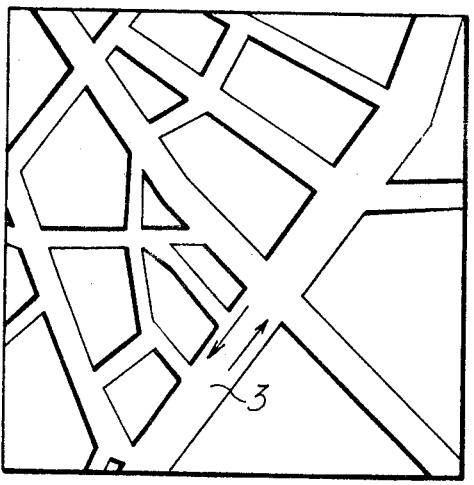
FIGS. 2A, 2B and 2C represent a fixed-image, a variable image and a composite image respectively, where the latter image corresponds to a second case of traffic build-up.
Figure 2B:
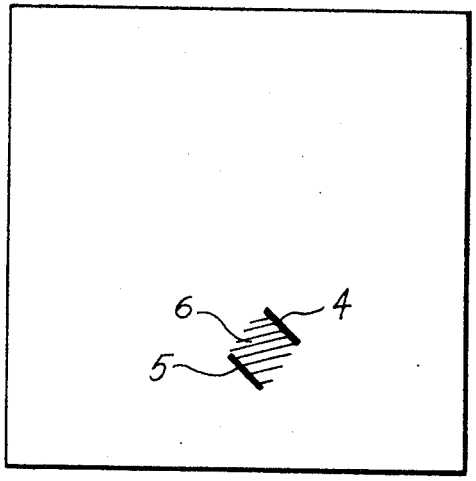
Figure 2C:
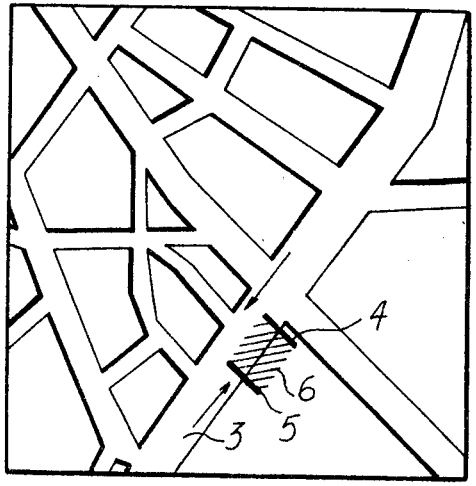

Looking now at FIGS. 1A, 1B and 1C, FIG. 1A depicts the plan of a town's district; FIG. 1B depicts a traffic flow and build-up symbol and FIG. 1C is a representation of FIGS. 1A and 1B superimposed. In a similar way, FIG. 2A depicts the plan of a town's district; FIG. 2B depicts the traffic flow and build-up symbols and FIG. 2C is a superimposition of FIGS. 2A and 2B.

Avenue 1 (FIG. 1A) is a one-way street and is blocked off (FIG. 1C) by a thick bar 2 covering the whole width of the street, indicating that there is traffic building-up on avenue 1 at the point shown by bar 2.

Road 3 (FIG. 2A) has two-way traffic and is blocked off (FIG. 2C) by two separated bars 4 and 5 covering just half the width of the road. Between the two bars is a shaded area 6. This means that the direction corresponding to the traffic blocked off by bars 4 and 5, there is a traffic jam depicted by shaded area 6.

The indication employed for pointing out traffic build-up, jams, detours, parts of the road under black ice, snow, floods, . . . can give rise to a wide choice of symbols and signs and the present invention is in no way bound by the choice made.

With reference to FIG. 3, the symbols of FIG. 1B and 2B are coded by the following messages:

FIG. 1B: number of the town district; coordinates of the middle of segment 2; orientation and length of segment 2.

FIG. 2B: number of the town district; coordinates of the middle of segment 4; coordinates of the middle segment 5; orientation and length of segments 4 and 5; binary mode orientation and length controlling the illumination of all the points of the LCD lying between segments 4 and 5.

Reference numerals 11, 12, . . . represent shift register respectively containing the messages defining FIG. 1B and FIG. 2B. These registers are controlled by time base 13. The output signals from registers 11, 12, . . . are time multiplexed in multiplexer 14; the multiplexed signal is fed into a modulator 15 receiving a radio-frequency wave from a local oscillator 16 and the modulated radio-frequency signal is fed into a radio-frequency amplifier 17 and a transmitter aerial 18.

Figure 4:
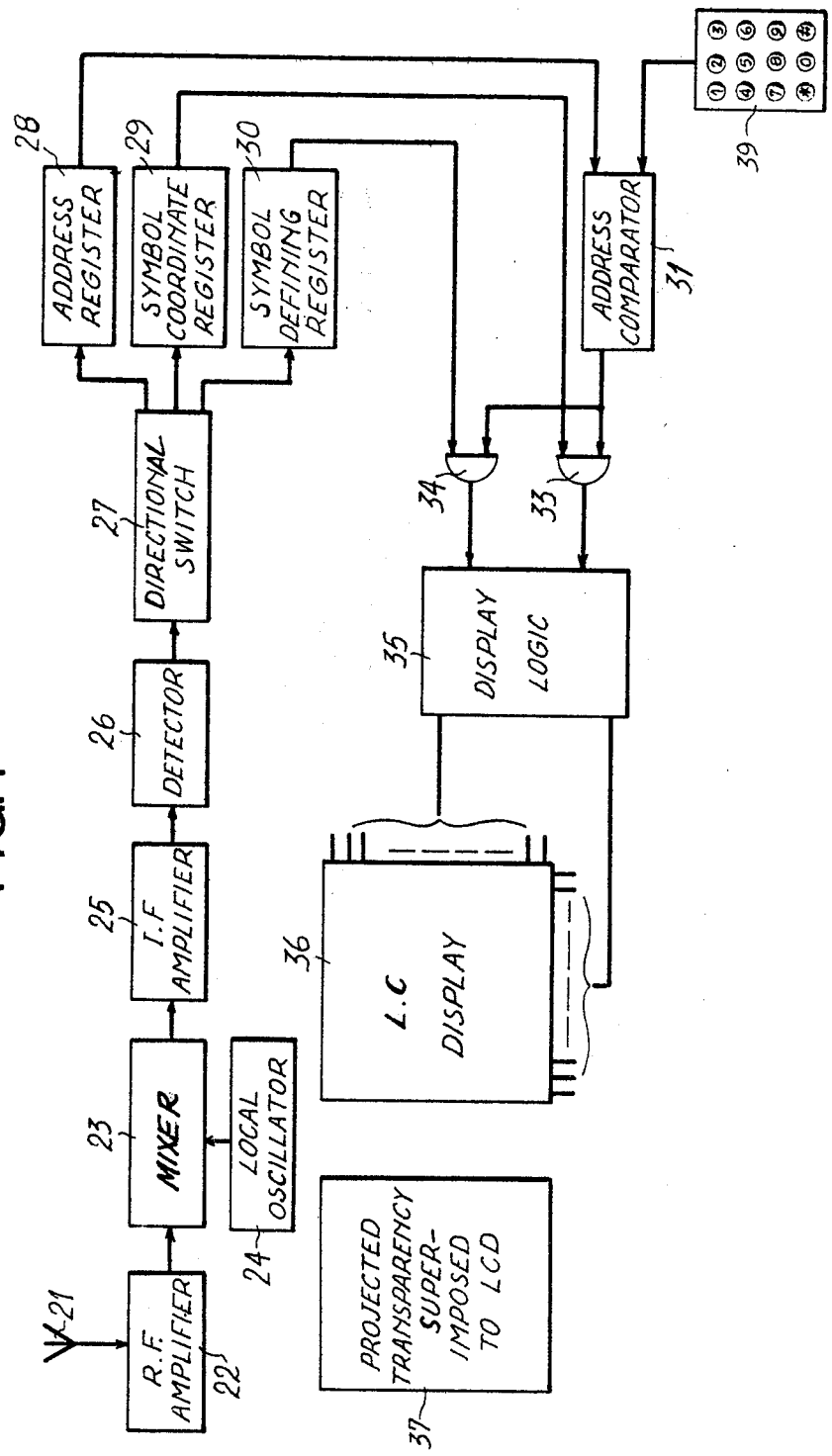
FIG. 4 represents, in block-diagram form, a receiver unit in a first embodiment of the system.

FIG. 4 depicts one receiver unit embodiment. It comprises an aerial 21, a radio-frequency amplifier 22, a frequency changer 23 receiving a local wave from a local oscillator 24, an intermediate frequency amplifier 25 and a detector 26. Detector 26 is linked to a directional switch 27 which directs the town district address to an address register 28, the coordinates to a coordinate register 29 and the symbol parameters to a symbol defining a register 30.

The address stored in address register 28 is compared in an address comparator 38 which receives from a dialing keyboard 39 a reference address which is that ascribed to the sector where the driver is. Comparator 40 38 in the event of coincidence of the reference address and the stored address emits an output signal which opens AND gates 33 and 34, giving access to a symbol and symbol coordinates logic 35. Symbol logic 35 controls liquid crystal display 36.

The transparency 37 is projected on to LCD 36.

Figure 5A:
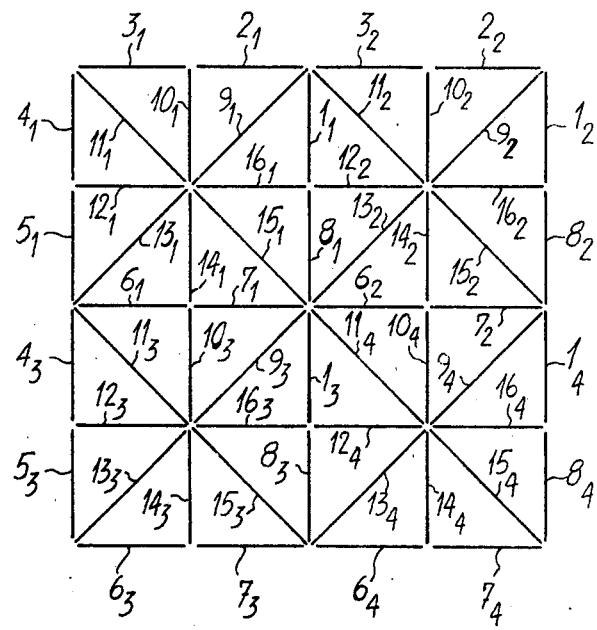
FIGS. 5A, 5B and 5C show how the symbols of FIGS. 1B and 1C are generated on the LCD.
Figure 5B:
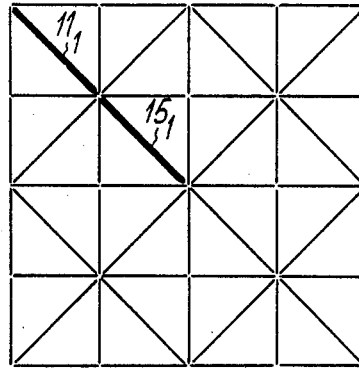
Figure 5C:
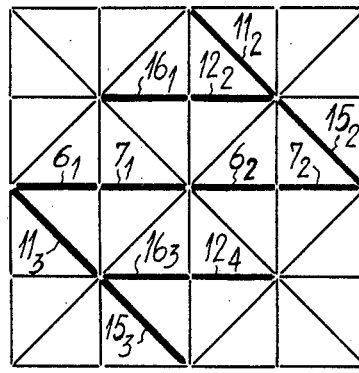

FIGS. 5A, 5B and 5C show how the symbols of FIGS. 1B and 2B are displayed.

Let us assume that the LCD is formed by contiguous sixteen segment characters. Four characters are represented in FIG. 5A and the corresponding segments are given reference numerals $1_1$ to $16_1$, $1_2$ to $16_2$, $1_3$ to $16_3$ and $1_4$ to $16_4$. The boundary segments bear two different reference numerals, for example segments $1_1$ and $4_2$ designate one and the same segment. In such cases, only the reference numeral having the lower substrict is retained.

The symbol of FIG. 1B is obtained (FIG. 5B) by illuminating segments $11_1$ and $15_1$.

The symbol of FIG. 2B is obtained (FIG. 5C) by illuminating segments $11_2$, $15_2$, $11_3$, $15_3$, $16_1$, $12_2$, $6_1$, $7_1$, $6_2$, $7_2$, $7_2$, $16_3$ and $12_4$.

In a further example of assisted motor vehicle traffic flow, the transmitter unit, instead of periodically transmitting road sign messages valid at a given moment, transmits only, each time there is a change in the traffic situation, a first message of the indication and build-up symbols which are cancelled, a second message of the indication and build-up symbols which are held, and lastly a third message of the indication and build-up symbols which are new. The three messages carry the same address and all three thus open AND gates 33 and 34. The address does, however, include an index not taken into account when selecting messages to be received in a given receiver unit but which is intended to mark one of three marking terminals A, B and C of address register 28. Moreover, the messages received are memorized in a buffer memory 38.

When the receiver unit receives the message on the symbols to be cancelled, address register 28 supplies a 1 at its A terminal which opens gates $43_A$ and $45_A$. Display logic 35 and buffer incoming 38 are scanned in synchronism and each time a 1 is read in memory 38, a 0 is entered in the corresponding memory location in memory of display logic 35, thereby causing the obsolete indication and build-up symbols to be blanked out.

When the receiver unit receives the images of the symbols to be held, address register 28 supplies a 1 at its B terminal which opens gates $43_B$ and $45_B$ interposed between the respective outputs of memories 38 and 35 and activates a comparator 39. This comparator compares the characters of identical location in the two memories and produces a 1 at its output in the event of a positive comparison. This 1 is fed to input gate $47_B$ giving access to the memory in display logic 35. As a result, should the comparison be positive, then the signals read in 35 are re-entered therein with a delay due to delay circuit 40. Were the comparison to be negative, then the case of a signal being contained in 35 and not contained in 38 is distinguished from the case of a signal being contained in 38 and not contained in 35. These discordances are settled in favor of memory 35. In the first case, the signal read in 35 is re-entered therein via gate $48_B$. In the second case, the signal is directed towards an error circuit 41, via gated $49_B$. Finally, upon receiving the new indication, AND gate $43_C$ is opened by a 1 at terminal C of address register 28 and there is a transfer from the buffer memory 38 to the memory in display logic 35.

Figure 7:
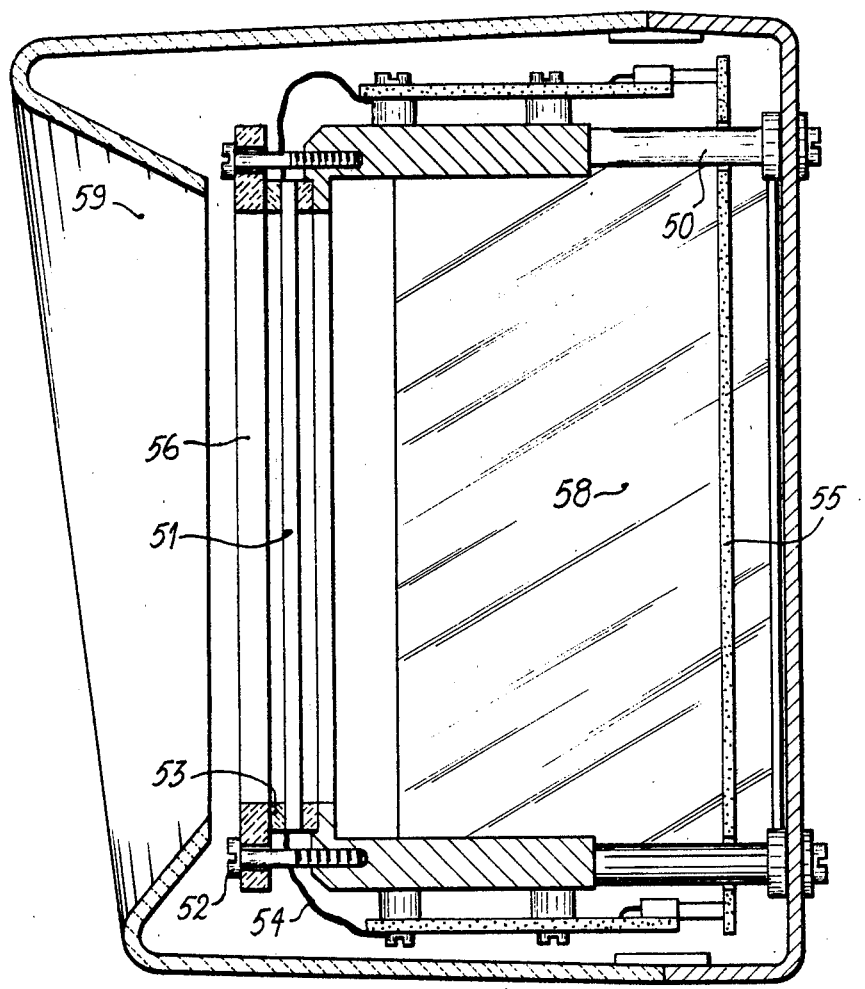
FIG. 7 represents the composite display of the invention.
Figure 9:
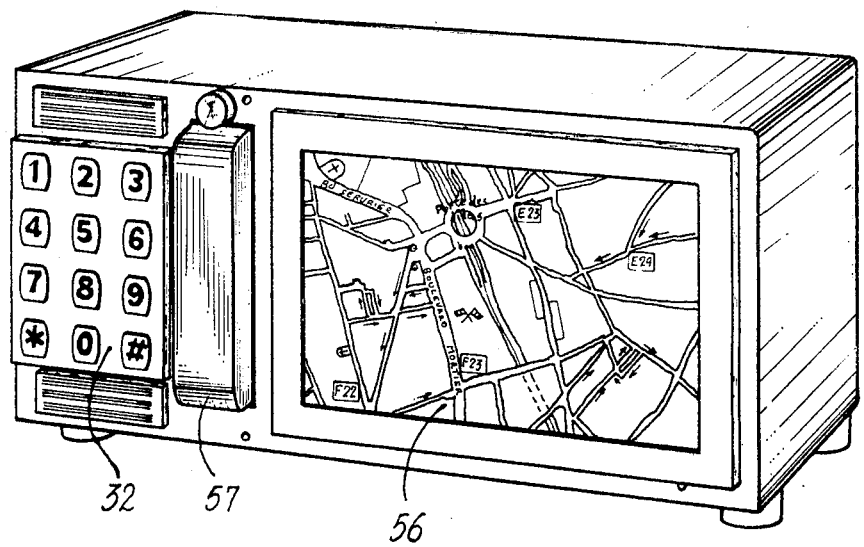
FIGS. 8 and 9 show a perspective view of the receiver unit.
Figure 8:
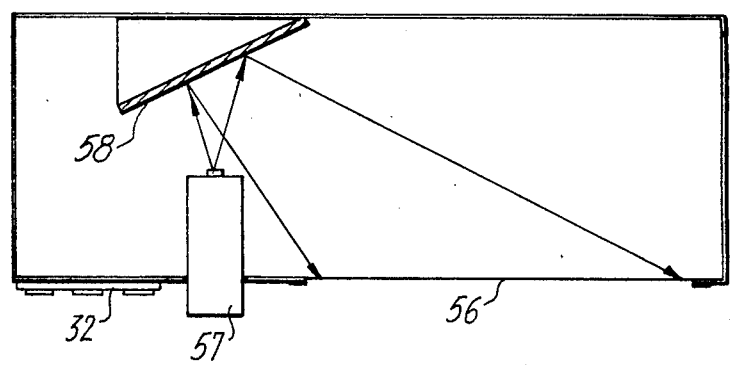

Referring now to FIGS. 7 and 8, the display device comprises a frame 50, a large area liquid crystal display panel 51 attached to the frame by screws 52. This display panel is connected to the display logic 35 by snap on terminal strips 53, elastometric connections 54 and a printed card board 55.

Before and close to the LC display 51, a transparent screen 56 is attached to the frame. The map provided by the film in cassette 57 is imaged on to screen 56 by a plane mirror 58. The display device is protected by a cover 59.

On FIG. 8, one can see the dialling keyboard 32, the cassette 57, the screen 56 and the mirror 58.

We claim:

1. Radio system for video display of a map and symbols traced on said map comprising:
   means for radio transmitting a plurality of digital messages, each including the address of a map among a plurality of maps, the definition of symbols among a plurality of symbols and the coordinates of said symbols on said map;
   a display device having a plurality of points defined by coordinates and which can be selectively activated;
   a plurality of transparent views representing said maps and having addresses assigned thereto;

means for selecting from among said view plurality the view having a given address;

means for projecting the selected view on to said display device;

means for selecting from among said address message-plurality the message including a map address equal to said selected view address; and display logic means for activating selected points of the display device in response to the definition and coordinates of the symbols contained in the selected message.

2. Radio system as set forth in claim 1 in which the display device is a large area transflective viewing mode liquid crystal display.

3. Radio system as set forth in claim 1 in which the transparent views are transparencies.

4. Radio system as set forth in claim 1 in which the transparent veiws are views in a film cassette.

5. Radio system for video display of a map and symbols traced on said map comprising:

means for radio transmitting sequentially a plurality of digital messages, each including the address of a map among a plurality of maps, the definition of symbols among a plurality of symbols and the coordinates of said symbols on said map, the symbols in a given message being classified, with respect to the symbols in the preceding message relative to the same map address, as symbols to be deleted, symbols to be held and new symbols, each of said symbol classes being designated by a flag;

a display device having a plurality of points defined by coordinates and which can be selectively activated;

a plurality of transparent views representing said maps and having addresses assigned thereto;

means for selecting from among said view plurality the view having a given address;

means for projecting the selected view onto said display device;

means for selecting from among said address-message plurality the message including a map address equal to said selected view address; and a display logic means controlled by said flags for de-activating the points of the display device in response to the definition and coordinates of the symbols to be deleted, continuing the activation of the points of the display device in response to the definition and coordinates of the symbols to be held and activating the points of the display device in response to the definition and coordinates of the new symbols.

* * * * *